United States Patent [19]

Butler et al.

[11] 4,411,875
[45] Oct. 25, 1983

[54] DUAL ALKALI PROCESS FOR COMBUSTION GAS CLEANING

[75] Inventors: Robert S. Butler; Paul F. Claerbout, both of Effingham; Louis P. Kent, Mattoon; Randy S. Cleland, Hillsboro, all of Ill.; James H. Wilhelm, Sandy, Utah; Richard E. Micko, Spokane, Wash.

[73] Assignee: Central Illinois Public Service Company, Springfield, Ill.

[21] Appl. No.: 362,173

[22] Filed: Mar. 25, 1982

[51] Int. Cl.³ .............................................. C01B 17/00
[52] U.S. Cl. .................................... 423/242; 423/166; 423/512 A
[58] Field of Search .......... 423/242 A, 242 R, 244 A, 423/244 R, 512 A, 166

[56] References Cited

U.S. PATENT DOCUMENTS

| | | | |
|---|---|---|---|
| 3,607,033 | 9/1971 | Shah | 23/167 |
| 3,653,812 | 4/1972 | Schneider et al. | 423/242 |
| 3,653,823 | 4/1972 | Shah | 23/129 |
| 3,775,532 | 11/1973 | Shah | 423/242 |
| 3,873,532 | 3/1975 | Dahlstrom et al. | 423/242 |
| 3,911,084 | 11/1975 | Wall et al. | 423/242 |
| 3,944,649 | 3/1976 | Field et al. | 423/242 |
| 3,989,464 | 11/1976 | Dahlstrom et al. | 23/260 |
| 3,989,797 | 11/1976 | Brady et al. | 423/242 |
| 4,147,756 | 4/1979 | Dahlstrom et al. | 423/242 |

*Primary Examiner*—Gregory A. Heller
*Attorney, Agent, or Firm*—Trexler, Bushnell & Wolters, Ltd.

[57] ABSTRACT

A dual alkali process and an apparatus for the removal of sulfur oxides from a gas stream containing such sulfur oxides, is disclosed.

6 Claims, 1 Drawing Figure

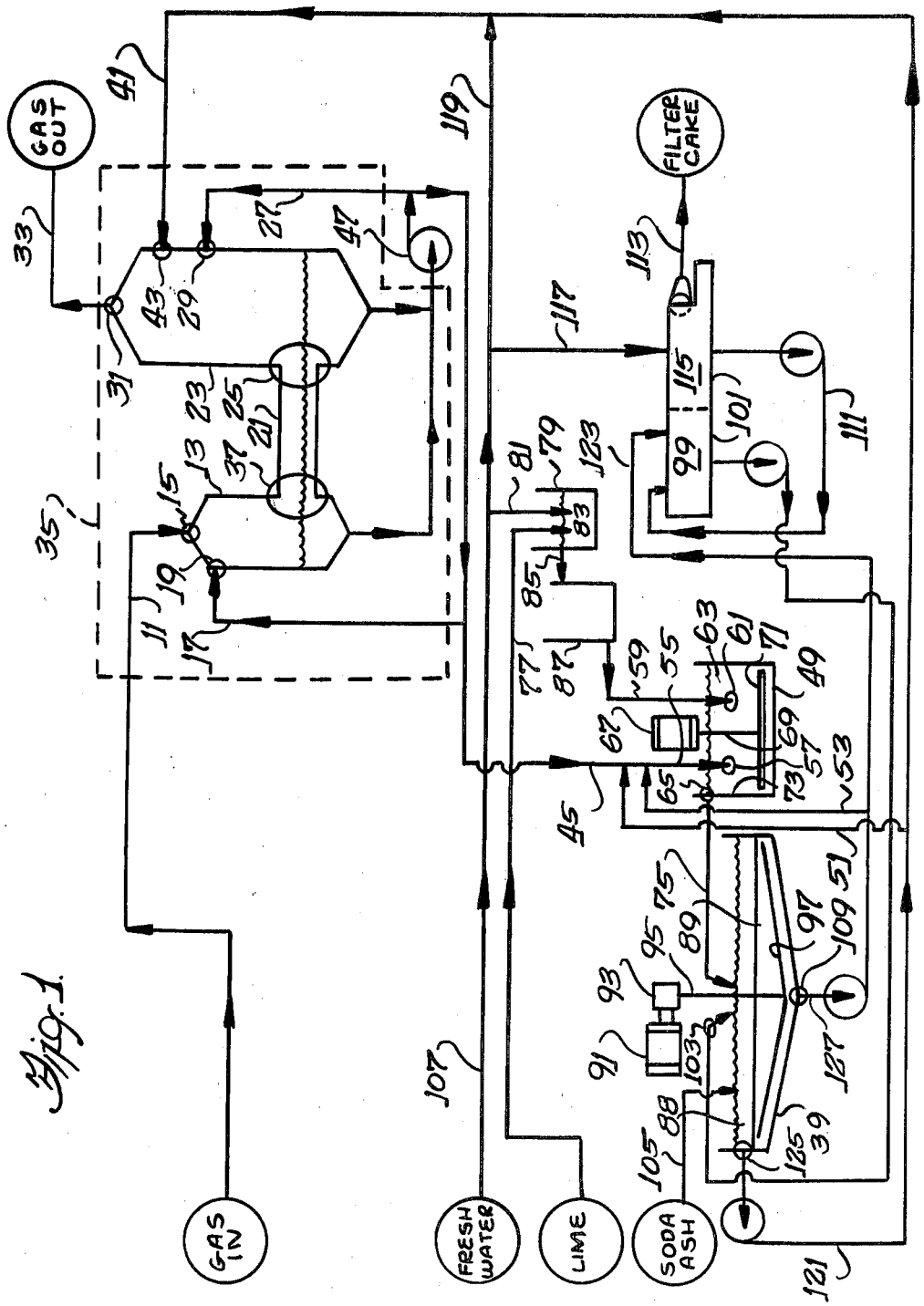

DUAL ALKALI PROCESS FOR COMBUSTION GAS CLEANING

BACKGROUND OF THE INVENTION

1. Field of the Invention

This invention generally relates to a process and apparatus for combustion gas cleaning; and more particularly, relates to a dual alkali process and apparatus for removing sulfur oxides, primarily present as sulfur dioxide, from combustion gases. Relatively small amounts of chlorides can be present with the sulfur oxides in the combustion gas prior to removal of the sulfur oxides. The combustion gases result from a variety of combustion processes generally employing a fuel which has significant sulfur content and less than significant chloride content. To date, the invention has proved useful in cleaning coal-fueled, power-generating-plant, combustion gases prior to the release of the combustion gases to the atmosphere. It can be appreciated that the invention is particularly applicable to the removal of sulfur dioxide from the waste gases of power plants, steam generators, space heating boilers and a variety of manufacturing facilities such as metallurgical smelters, sulfuric acid production facilities and organic sulfonation processes.

As used hereinafter, the term "alkali" is used generically and refers both to "the alkali-metals", a group generally recognized as consisting of the elements lithium (Li), sodium (Na), potassium (K), rubidium (Rb), cesium (Cs) and francium (Fr), and to "the alkaline-earth metals", a group generally recognized as consisting of the elements beryllium (Be), magnesium (Mg), calcium (Ca), strontium (Sr), barium (Ba), and radium (Ra).

2. Description of the Prior Art

It is well known that technology for removal of sulfur oxides from gas streams is quite broad. It is equally well known that removal of at least a portion of sulfur oxides from gas streams is usually done to meet governmentally established environmental procedures. A portion of the existing broad technology relates to a variety of processes which employ several basic steps. A first step generally comprises adding a first chemical to the sulfur oxide bearing gas stream to remove at least a portion of the sulfur oxides from the gas stream. During the first step, the sulfur oxides and first chemical combine to form a second chemical. The first step is generally referred to as the sulfur oxide "scrubbing step" even though the first step need not take place within a scrubber. A second step generally comprises adding a third chemical to the second chemical to cause an easily-removable sulfur-bearing compound to form. Thereupon, certain process equipment operates in a fashion as to cause the sulfur oxides to be physically partially removed from the gas stream in the form of the sulfur-bearing compound. During the second step, a fourth chemical, in addition to the easily-removable sulfur-bearing compound, is formed. The second step is generally referred to as the sulfur oxide "removal step". A third step generally comprises adding a fifth chemical to the fourth chemical to regenerate the first chemical. The first chemical is then re-used in the first step. The third step is generally referred to as the "regeneration step".

Quite often, a process deemed necessary to achieve the scrubbing, removal and regeneration steps outlined above is less than simple. Processes requiring expensive and exotic equipment are as well known as processes requiring complex operating procedures.

Mechanisms useful in the present invention are also well known. The principle mechanisms observed to be occurring in the process equipment of the present invention appear below as chemical equations 1 through 4.

$$Na_2SO_3 + SO_2 + H_2O \rightarrow 2NaHSO_3. \tag{1}$$

$$CaO + H_2O \rightarrow Ca(OH)_2. \tag{2}$$

$$Ca(OH)_2 + 2NaHSO_3 \rightarrow CaSO_3 \downarrow + Na_2SO_3 + 2H_2O. \tag{3}$$

$$Na_2CO_3 + 2NaHSO_3 \rightarrow 2Na_2SO_3 + CO_2 \uparrow + H_2O. \tag{4}$$

Equation (1) represents the scrubbing step where an aqueous sodium sulfite ($Na_2SO_3$) solution is used to remove at least a portion of sulfur dioxide ($SO_2$) from a gas stream. Equation (1) also illustrates the formation of sodium bisulfite ($NaHSO_3$). Equation (2) represents a lime-slaking step where lime (CaO) combines with water ($H_2O$) to become slaked lime ($Ca(OH)_2$). Equation (2) is illustrative of introduction of a first alkali (calcium being one of the alkaline-earth metals) into the process equipment of the present invention. Equation (3) represents the removal step where slaked lime combines with an aqueous solution of sodium bisulfite thereby causing a precipitate of calcium sulfite ($CaSO_3 \downarrow$) to form. Equation (4) represents the regeneration step where soda ash ($Na_2CO_3$) is added to the aqueous solution of sodium bisulfite to regenerate sodium sulfate. In this regeneration step, some gaseous carbon dioxide ($CO_2 \uparrow$) evolves as a reaction product. Equation (4) is illustrative of introduction of a second alkali (the soda ash comprising a sodium part and a carbonate part, the sodium part being one of the alkali metals) into the process equipment of the present invention.

It is known that certain sulfur oxides and sulfur dioxide react in a chemically similar fashion. As used herein, the term "sulfur oxides" is used generically in reference to any compound formed from sulfur (S) and oxygen (O). Sulfur dioxide ($SO_2$) and sulfur trioxide ($SO_3$), therefore, are specific kinds of sulfur oxides.

It is also known that certain alkali-metal compounds and certain related alkali-metal compounds react in a chemically similar fashion, these certain alkali-metal compounds comprising cationic portions containing one kind of alkali-metal and anionic portions, the related alkali-metal compounds comprising cationic portions containing at least one other kind of alkali-metal and the same anionic portions. It is similarly known that certain alkaline-earth metal compounds and certain related alkaline-earth metal compounds react in a chemically similar fashion, these certain alkaline-earth metal compounds comprising cationic portions containing one kind of alkaline-earth metal and anionic portions, the related alkaline-earth metal compounds comprising cationic portions containing at least one other kind of alkaline-earth metal and the same anionic portions.

As can be appreciated by those skilled in the art, the four chemical equations presented above are illustrative of mere generalizations or simplified tendencies to reaching chemical equilibrium. Such equations typically give no information as to the time required to achieve chemical equilibrium, nor do they give information as to the relative percentage or yield of reactant (any chemical located at the left of the horizontal arrow) that converts into product (any chemical located at the right of the horizontal arrow).

In a process designed to remove sulfur dioxide from combustion gas, the percentage of sulfur dioxide which must be removed is often critical. Elaborate processes requiring significant outlay of capital are well known in the sulfur dioxide gas-scrubbing art.

Desired overall sulfur dioxide removal efficiency is usually the effect of such phenomena as reaction kinetics, chemical equilibrium, thermodynamics, energy of activation, nucleation rate, crystal growth rate, and a variety of other phenomena, all of which are governed by physical laws. These phenomena, in turn, are combined with current economics to define process operating conditions (often referred to as operating parameters) such as operating temperature, solution pH, reactant concentration, reaction residence (or contact) time, and type of reactor for processes designed to remove sulfur dioxide from a sulfur dioxide-bearing gas stream. Usually, overall sulfur dioxide removal efficiency is dependent upon certain additional process equipment being functionally incorporated into an overall process design. Such process equipment is often especially designed to meet specific mixing, leaching, ion-exchanging, classifying, decanting, filtering, screening, centrifuging, or other process requirements. Such additional process equipment often necessarily operates in combination with scrubbing or clarifying equipment, holding tanks or reactors.

Reference is made to U.S. Pat. Nos. 3,911,084; 3,989,797 and 4,147,756 as illustrative of prior art processes and systems over which the present invention provides significant improvements.

It is an object of the present invention to provide an efficient and simple process for the removal of sulfur oxides, primarily present as sulfur dioxide, from waste gas streams.

Another object is to provide a cost-efficient process for removal of sulfur oxides from waste gas streams, the physical process requiring a minimal outlay of capital.

A further object is to provide a process of the above-described type which is an improvement over commercially available processes.

These and other objects and advantages of the present invention will become evident from the description which follows.

SUMMARY OF THE INVENTION

When the present invention is used in combination with a scrubbing unit, the process equipment of the present invention comprises a clarifier, a reactor, and a filtration device. A stabilization vessel and a slaking vessel, although included in FIG. 1, are not pieces of equipment necessarily essential to the process of the present invention.

In accordance with the objects of the present invention, there is disclosed a process and an apparatus for removing a portion of sulfur oxides generally present in combustion gas streams. The process operation is not affected by small amounts of chlorides, also present with the sulfur oxides, in the combustion gas. For example, the present invention may be used to reduce the amount of sulfur oxides (primarily present as sulfur dioxide) in combustion gases of coal-fired boilers before the combustion gases are released to the atmosphere. The coal fuel supplied to the boilers currently contains about 0.08 percent chlorides. The process and apparatus of the present invention require much less process equipment than conventional processes and therefore is simpler, is easier to operate, and requires less outlay of capital than conventional processes designed to remove sulfur oxides from gas streams.

One feature of the process of the present invention is that it allows for efficient removal of a sulfur-bearing waste product, which forms and grows as a precipitate in the reactor or clarifier and which is removed from the process as a filter cake. The invention contemplates improved waste removal through (control of) certain operating parameters, such as reactor pH, reactant inlet regions, impeller tip speed, and reactor residence time. The overall design of the process parameters of the present invention co-operatively combine to allow a process operator to effectively control precipitate crystal growth.

The size of the precipitate crystal is an important consideration because a bigger crystal generally dewaters more easily than a smaller crystal. This means that a bigger precipitate crystal generally improves the efficiency of any one of a number of commercially available filtration devices. Prior to implementation of the present invention, the filter cake had been in the forty percent solids range; using the process and system of the present invention, the filter cake is currently in the 60–70 percent solids range. In both instances, the filter cake solids are essentially the precipitate crystal, and the liquid portion of the filter cake is essentially water.

It is important that certain reactor operating conditions be sufficiently controlled to effectively permit proper precipitate crystal formation and growth in the reactor. A variety of reactor operating parameters are involved, and the most important have been observed to be reactor solution pH, reactor residence time, and impeller tip speed. The process of the present invention has focused on these and other reactor operating parameters, as disclosed below in observations and details of how these parameters interact to produce precipitate crystals having desired physical characteristics.

Another feature of the present invention is that it permits operation of the scrubbing unit in a much more efficient and maintenance-free manner than is permitted by currently available commercial sulfur oxides scrubbing processes. As illustrated in FIG. 1, the scrubbing unit, comprising a precooler column and a scrubber column, operatively interconnected to permit free flow of combustion gas and scrubber liquor, is clearly an improvement over U.S. Pat. No. 4,147,756. The present invention supplies a single scrubber liquor, which is essentially neutral in pH, to the precooler column and to the scrubber column. U.S. Pat. No. 4,147,756 discloses that a first scrubber liquor, highly acidic in pH, is circulated through a precooler column and that a second scrubber liquor, essentially neutral in pH, is circulated through a scrubber column. Both of these columns are operatively connected essentially as disclosed in FIG. 1. Those skilled in the art can appreciate that using a highly acidic scrubber liquor, as compared to using an essentially neutral scrubber liquor, substantially increases the probability of increased maintenance costs and capital outlays in connection with the precooler column, the scrubber column and certain auxiliary and certain other peripheral equipment.

The chemical mechanisms referred to above as equations 1–4 are illustrative of the requirements and some of the capabilities of the present invention. In addition to these four principle mechanisms, it is known that certain sulfites oxidize to become certain sulfates, at some point in the process; and it is currently believed that such oxidation occurs in the scrubbing unit.

FIG. 1 illustrates that when using the present invention in the preferred embodiment, lime and soda ash are required to remove sulfur dioxide from a sulfur dioxide-bearing gas stream. It is well known that lime and soda ash are both widely available chemicals, and that they are both readily capable of being transported in bulk quantities.

In addition, the present invention is capable of using these readily available chemicals to remove sulfur oxides, primarily present as sulfur dioxide, from a coal-fired boiler combustion gas stream. Example 1 (presented below) illustrates the utility of the present invention in removing $SO_2$ from an operating commercial coal-fired combustion gas stream. The fourth row in Example 1 presents the calculated gaseous $SO_2$ rate into the scrubbing unit. The first row presents the measured gaseous $SO_2$ rate out of the scrubbing unit. The fifth row presents the calculated gaseous $SO_2$ removal efficiency.

Example 2 (presented below) illustrates the low sodium content and relatively dry nature of the filter cake being removed from the process.

EXAMPLE 1

|  | Test[a] Number | | | | | |
|---|---|---|---|---|---|---|
|  | 1 | 2 | 3 | 4 | 5 | 6 |
| $SO_2$ Emission rate[b] to atmosphere, lbs/hr (tons/hr) | 2695.1 (1.35) | 2844.4 (1.42) | 2880.0 (1.44) | 2794.7 (1.40) | 2773.3 (1.39) | 2759.1 (1.38) |
| Coal burned[c], tons/hr | 210.6 | 209.3 | 210.9 | 210.9 | 210.4 | 211.6 |
| Sulfur content of coal burned[c], % sulfur | 2.48 | 2.58 | 2.58 | 2.59 | 2.60 | 2.47 |
| Calculated[d] combustion gas $SO_2$ rate into scrubbing unit, lbs/hr (tons/hr) | 19,847 (9.92) | 20,520 (10.26) | 20,677 (10.34) | 20,757 (10.38) | 20,788 (10.39) | 19,861 (9.93) |
| Calculated[e] $SO_2$ removal efficiency of scrubbing unit, % | 86.4 | 86.2 | 86.1 | 86.5 | 86.6 | 86.0 |

[a] Data based on EPA compliance tests.
[b] Emission rates based on average flue gas volume of 1,185,185 DSCFM (dry standard cubic feet per minute) taken by velocity traverse.
[c] As received (fired).
[d] Calculation performed assuming that 95% of the sulfur present in the coal fed to the boiler converts into $SO_2$; and further assuming that the converting sulfur reacts essentially thusly: $S + O_2 \rightarrow SO_2$.
[e] Removal efficiency calculation performed by subtracting $SO_2$ emission rate to atmosphere from calculated combustion gas $SO_2$ rate into scrubbing unit to form a numerator, then multiplying the numerator by 100 to form a product and then dividing the product by the calculated combustion gas $SO_2$ rate into the scrubbing unit to obtain $SO_2$ removal efficiency of the scrubbing unit, expressed as a percentage.

EXAMPLE 2

| Filter Cake Components | Relative Percentage (dry basis), % |
|---|---|
| Calcium sulfite | 65 to 75 |
| Calcium sulfate | 5 to 15 |
| Calcium carbonate | about 5 |
| Calcium oxide | about 1 |
| Remainder[f] | about 4 to about 24 |

[f] The remainder comprises a variety of different hydrate forms and varying percentages of sodium carbonate, sodium sulfate, and numerous other compounds of silicon, aluminum, iron, magnesium and chlorine, to name a few.

BRIEF DESCRIPTION OF THE PREFERRED EMBODIMENT

FIG. 1 illustrates a preferred embodiment of the present invention. Briefly, the invention requires certain reactants and certain key pieces of process equipment to scrub sulfur oxides from a gas stream containing sulfur oxides prior to releasing the gas stream to the atmosphere. A filter cake is removed from the process as a waste material.

A key piece of process equipment is a reactor wherein precipitate crystals are formed and grown. Reactor residence time, solution pH and degree of agitation are controlled so as to grow precipitate crystals having diameters of a desired range.

DETAILED DESCRIPTION OF THE PREFERRED EMBODIMENT

The invention as disclosed in FIG. 1 contemplates that an unscrubbed combustion gas stream be continuously conveyed within a conduit 11 and introduced into a precooler column 13 at an upper inlet region 15. In this particular embodiment, the unscrubbed combustion gas is flue gas coming from a coal-fired boiler of a power plant. However, the present invention is generally useful for the removal of sulfur oxides from the unscrubbed combustion gases of steam generators, space-heating boilers and a variety of manufacturing facilities.

Upon entering the precooler column 13, the unscrubbed combustion gas is intimately contacted by a mist or fine spray of scrubber liquor conveyed by a conduit 17 and continuously introduced into the precooler column 13 at a region 19 proximate to the unscrubbed combustion gas inlet region 15. Intimate contact between the unscrubbed combustion gas and the scrubber liquor causes the combustion gas to cool from a range of about 149 to 177 degrees Centigrade (about 300–350 degrees F.) down to a combustion gas saturation temperature which is approximately 54 degrees C. (about 130 degrees F.). In addition to cooling the unscrubbed combustion gas, the scrubber liquor contains an effective amount of a suitable alkali-metal sulfite which is reactable with the sulfur oxides and which is particularly reactable with sulfur dioxide and which combines with the sulfur oxides in a manner as to scrub at least a portion of the sulfur oxides out of the combustion gas stream, thereby producing a partially scrubbed combustion gas stream which leaves the precooler column 13 at a region 37 near the precooler column 13 bottom. The preferred alkali-metal sulfite is a suitable aqueous solution of sodium sulfite. As the alkali-metal sulfite chemically reacts with the sulfur oxides, sulfur-bearing compounds form.

A physical design for the precooler column 13 can be any one of a number of commercially available designs which provide effective intimate contact between the combustion gas and the scrubber liquor. In this particular description, the precooler column 13 is illustrated as an essentially vertical column through which a gas stream and a liquid stream downwardly flow essentially co-currently and continuously. The precooler column 13 is designed to permit an effective degree of intimate gas-liquid contact.

Exiting the precooler column 13, the partially scrubbed combustion gas passes through a piece of interconnecting conduit 21 before entering the scrubber column 23. The partially scrubbed combustion gas enters at a region 25 near the base of the scrubber column 23 and flows upwardly generally counter-currently to a continuous spray or fine mist of the above-described scrubber liquor which is introduced by a conduit 27 into the scrubber column 23. The scrubber liquor is introduced into the scrubber column 23 at a region 29 sufficiently near the top of the scrubber column 23, to permit an effective degree of intimate gas-liquid contact to take place between the partially scrubbed combustion gas and scrubber liquor, thereby producing a stream of scrubbed combustion gas which exists at a region 31 near the top of the scrubber column 23. The scrubbed combustion gas exiting the scrubber column 23 is continuously conveyed within a conduit 33 away from the scrubber column 23 and thereafter released to atmosphere.

A scrubbing unit 35 comprises the precooler column 13, the scrubber column 23, and the piece of interconnecting conduit 21. The piece of interconnecting conduit 21 is shown as being integral with or flanged to the precooler column 13 at the region 37 near the base of the precooler column 13 and the scrubber column 23 at the other region 25 near the base of the scrubber column 23. In addition, the piece of interconnecting conduit 21, as shown, is designed to permit an effective degree of internal communication of either combustion gas or scrubber liquor or both combustion gas and scrubber liquor between the precooler column 13 and scrubber column 23.

The pH of the scrubber liquor being added to the scrubbing unit 35 is continuously controlled to maintain a proper pH within the scrubbing unit 35. A pH of between about 5.5 and about 7 (and preferably at about 6) within the scrubbing unit 35 insures that a desired amount of sulfur oxide is absorbed from the combustion gas and is reacted forming sulfur-bearing compounds in the scrubber liquor, thereby producing a spent scrubber liquor. The species absorbed from the combustion gas is generally sulfur; and the sulfur-bearing compounds forming in the scrubber liquor comprise various sulfites, sulfates and small amounts of chlorides. Scrubber liquor pH is controlled by conveying a desired amount of regenerated liquor from a clarifier 39, at a controlled rate through a conduit 41 and into the scrubber column 23 at a suitable inlet point 43.

A desired amount of the sulfur-bearing compounds is maintained in the scrubber liquor and sulfur-bearing compounds are eventually removed from the scrubbing unit 35 by bleeding off a portion of the spent scrubber liquor at a controlled rate through a conduit 45. Spent scrubber liquor is that scrubber liquor which has made intimate contact with the combustion gas in either the precooler column 13 or scrubber column 23 and which is continuously being withdrawn from either of these two columns by appropriate pumping means 47. Spent scrubber liquor is continuously bled away from the scrubbing unit 35 through the conduit 45 to produce a sufficient quantity of scrubber bleed which is carried by the conduit 45 away from the scrubbing unit 35 and into a reactor 49.

The scrubbing unit 35 can be of any one of a number of commercially available designs. Because the scrubber liquor is a clear, well-buffered solution, scrubbing unit designs having a low gas pressure drop are preferred. For purposes of illustration, suitable scrubbing units can be designed to have open spray towers, packed towers, or perforated-tray towers, for example.

Before being introduced into the reactor 49, the scrubber bleed conveyed by the conduit 45 can be mixed with a portion of the regenerated liquor and with a portion of an underflow slurry, the source of both the regenerated liquor and the underflow slurry being the clarifier 39. (When sodium is used as an active alkali-metal for purposes of regenerating a sulfite species from a bisulfite species, an active sodium concentration in the regenerated liquor generally ranges from about 0.3 to about 2 molar.) These portions of regenerated liquor and underflow slurry are respectively conveyed by conduits 51 and 53 to the reactor 49. In the vicinity of the reactor 49, the scrubber bleed conveyed by the conduit 45 combines with regenerated liquor conveyed by the conduit 51 and underflow slurry conveyed by the conduit 53 and upon combining is thereafter caused to be mixed to a degree sufficient to produce an admixture conveyed by a conduit 55 into the reactor 49. The rate of addition of either underflow slurry or regenerated liquor or both underflow slurry and regenerated liquor to the scrubber bleed is optional and at times may be reduced to zero for a variety of reasons. When regenerated liquor flow and underflow slurry flow are both zero, the admixture simply becomes a first reactant comprising scrubber bleed. The purpose of adding underflow slurry and regenerated liquor to scrubber bleed is to control admixture pH and to provide the reactor with seed crystals for crystal growth. The pH of the admixture being supplied to the reactor 49 generally ranges from about 7 to about 13 (and preferably ranges from about 8.5 to about 11). The admixture is introduced into the top of the reactor 45 at a first reactant inlet region 57.

A second reactant is conveyed by a conduit 59 and introduced into the reactor 49 at a second reactant inlet region 61 which is sufficiently removed from the vicinity of the first reactant inlet region 57 as to permit both the admixture and the second reactant individually to be added to and substantially combined with and effectively made a part of a reactor solution 63 contained in the reactor 49, before either the admixture or the second reactant effectively combine with each other. Moreover, the first reactant inlet region 57 and the second reactant inlet region 61 are both sufficiently removed from the vicinity of a reactor effluent port 65 as to permit the admixture and the second reactant individually to be sufficiently incorporated into the reactor solution 63 so as to permit effective crystal growth in the reactor solution 63, before the reactor solution 63 is discharged from the reactor 49 through the reactor effluent port 65.

The preferred reactor 49 is a continuous flow stirred-tank reactor (classically referred to as a continuous back-mix flow reactor) having a substantially vertically mounted agitator unit comprising an agitator drive 67, an agitator shaft 69, and an impeller 71. A critical reactor operating parameter, referred to as residence time, is defined as the quotient of the sum of the admixture and second reactant flow rates divided by the effective reactor volume. The effective reactor volume is controlled by raising or lowering the height of the reactor effluent port 65 along a side 73 of the reactor 49. Therefore, as flow rates into the reactor 49 are essentially continuous and somewhat invariable in the preferred mode of operation, reactor residence time is altered by changing the effective reactor volume. A conduit 75 conveying reactor effluent from the reactor 49 to the clarifier 39 must be sufficiently sized so as to permit the placement of the reactor effluent port 65 along the side 73 of the reactor 49 to effectively fix the height of the reactor solution 63 in the reactor 49, thereby controlling the residence time.

The admixture being conveyed by the conduit 55 and introduced into the reactor 49 is an aqueous solution prevailingly containing an alkali-metal bisulfite, an alkali-metal sulfite, an alkaline-earth metal sulfite, small amounts of other alkaline-earth metal and alkali-metal sulfur-bearing compounds, small amounts of alkaline-earth metal and alkali-metal chlorine-bearing compounds and small amounts of other alkaline-earth metal and alkali-metal bearing compounds. In the preferred embodiment, the alkali-metal is sodium.

The second reactant being conveyed by the conduit 59 and introduced into the reactor 49 is an aqueous solution of an alkaline-earth metal hydroxide. In the preferred embodiment, the alkaline-earth metal is calcium.

In the preferred embodiment, lime is transported by commercially available means, conveyed by a conduit 77, and introduced into a slaking vessel 79. Fresh water (herein generally defined as any raw, untreated water available from a fresh water source and generally conveyed to the process within a conduit 107) is conveyed by a conduit 81 and introduced into the slaking vessel 79 in a manner sufficient to cause the lime and fresh water to make contact and to cause at least a portion of the lime and at least a portion of the fresh water to chemically react and combine to form a slaked lime slurry 83 comprising calcium hydroxide (slaked lime) and water, the slaked lime slurry 83 initially forming in the slaking vessel 79. Fresh water is additionally added to the slaking vessel 79 through the conduit 81 for dilution purposes. The slaked lime slurry flows through a conduit 85 out of the slaking vessel 79 and into a stabilization vessel 87. In the preferred embodiment, lime slaking is carried out at about 82 to about 93 degrees C. (about 180–200 degrees F.), the residence time of the slaked lime slurry 83 in the stabilization vessel 87 is about ten minutes, and the slaked lime slurry 83 exiting the stabilization vessel 87 and being conveyed by the conduit 59 into the reactor 49 contains from about 15 to about 25 weight percent solids.

The particular design of process equipment which has been provided for lime slaking and which comprises the slaking vessel 79 and the stabilization vessel 87 in the preferred embodiment, is not considered essential to the overall operation of the present invention. It is currently believed that the lime slaking operation can be accomplished by any one of a number of commercially available pieces of process equipment such as ball mills, paste slakers and detention slakers, to name a few.

Regardless of the lime slaking process equipment employed, it currently has been observed that fresh water only should be added for both slaking and dilution purposes and that water from any other process stream illustrated in FIG. 1 should be avoided because such process streams contain certain compounds, such as sulfites and sulfates, which deleteriously affect desired recipitate formation or growth in the reactor 49.

It has been observed that agitation in the reactor 49 is an operating parameter which affects desired precipitate growth. Classically, agitated reactors are operated so as to provide vigorous mixing and combining of the reactants thereby insuring intimate and effective contact of the reactants and desired chemical conversions. Such a consideration infers using a high impeller tip speed in the reactor 49 so as to insure intimate contact of the reactants and adequate conversions to the desired products. However, it has additionally been observed that too high an impeller tip speed can deleteriously interfere with desired crystal growth. For example, in a preferred embodiment, when the admixture comprises an aqueous solution of sodium bisulfite and when the second reactant comprises slaked lime, it has been observed that too high an agitation level breaks up the forming precipitate crystals and that too low an agitation level inadequately mixes the reactants and inadequately suspends the forming precipitate crystals. It has also been observed that a desired level of agitation which provides for effective mixing of reactants and effective suspension of forming or growing crystals can be achieved by using certain standard impellers. Here, the important consideration is that the impeller tip speed should be sufficient to gently suspend and not break up the forming or growing precipitate crystals, which for most commercially available impellers, can be achieved when the impeller tip speed ranges from about 5 to about 15 feet per second. In the preferred embodiment, the impeller tip speed is about ten feet per second.

It has further been observed that pH of the reactor solution 63 in the reactor 49 is another operating parameter which affects desired precipitate crystal growth. When the admixture comprises sodium bisulfite and when the second reactant comprises slaked lime, the prior art teaches that a rapid rate of chemical reaction between these two reactants is desirable and that such rapid rate of chemical reaction can be achieved by controlling the reactor solution pH within certain limits. U.S. Pat. No. 3,911,084, for example, claims a reactor pH range of from about eight to about ten, and U.S. Pat. No. 3,989,797 claims a reactor pH range of from about 7.9 to about 9.5. Both of these patents teach away from controlling the reactor pH at higher than claimed pH values; and both of these patents teach away from operating the reactor at the pH values disclosed herein.

It has, however, been observed that rapid rates of chemical reaction deleteriously interfere with desired precipitate crystal formation or growth in the reactor 49 and that an increase of the reactor pH range up to from about 11 to about 13.5 tends to reduce the driving force for dissolving lime and thereby tends to slow down the rate of chemical reaction between the two reactants. Although the slower reaction rate results in fewer numbers of precipitate crystals forming, the precipitate crystals that do form tend to grow larger than the precipitate crystals that form at rapid rates of chemical reaction.

In the preferred embodiment, the reactor solution pH ranges from about 11 to about 12.3 (and preferably ranges from about 12 to about 12.3).

It is well recognized that residence time of the reactor solution 63 in the reactor 49 affects precipitate crystal growth. Using an admixture comprising an aqueous solution of sodium and a second reactant comprising a slaked lime slurry it has been observed that with about seven to about ten minutes of residence time, an average precipitate crystal will grow to about 20 microns (about 0.000787 inches) in diameter. It has also been observed that precipitate crystals having diameters ranging from about 20 to about 40 microns (about 0.000787 to about 0.001575 inches) exhibit desired dewatering and handling characteristics and that a reactor residence time sufficient to effectively grow precipitate crystals of such (range of desired) diameter ranges from about 7 to about 90 minutes.

The reactor effluent conveyed by the conduit 75 away from the reactor 49 and into the clarifier 39 ultimately separates in the clarifier 39 into a clarification zone 88 and a sludge zone 89, as illustrated in FIG. 1. The clarifier 39 presently being used is a commercially available agitated thickener having a diameter of about 30.5 meters (about 100 feet); the thickener includes a drive motor 91, a gear box 93, a drive shaft 95, and a rake assembly 97.

In addition to reactor effluent conveyed by the conduit 75, filtrate from a first stage 99 of a filter 101 is conveyed by a conduit 103 into the clarifier 39; and an active alkali-metal compound suitable for effective regeneration of the alkali-metal sulfite from the alkali-metal bisulfite is transported by commercially available means, conveyed through a conduit 105 and introduced into the clarifier 39. In the preferred embodiment, the active alkali-metal compound can be a sodium-based alkali selected from the group consisting of sodium hydroxide, sodium bicarbonate, sodium carbonate (soda ash), and mixtures thereof; but generally comprises soda ash.

In the preferred embodiment, the clarifier 39 (and more importantly the rake assembly 97) is (are) operated in a fashion sufficient to effectively keep precipitate crystals and other solids generally in suspension in the sludge zone 89 of the clarifier 39 so that precipitate crystals and other solids generally do not form or grow or settle and cause blockage at an underflow slurry take-away point 109 at the base of the clarifier 39, as illustrated in FIG. 1.

The aqueous suspension of precipitate crystals and other solids, hereinabove referred to as underflow slurry, is conveyed away from the clarifier 39 by a conduit 127. (That portion of underflow slurry which is optionally conveyed to the vicinity of the reactor 49 and combined with scrubber bleed conveyed by the conduit 45 has already been described hereinabove.) The remainder of underflow slurry, not combined with scrubber bleed, is conveyed by a conduit 123 and introduced into the first stage 99 of the filter 101.

At the clarifier 39, regenerated liquor is withdrawn from the clarification zone 88. Reactor effluent conveyed by the conduit 75, the alkali-metal compound conveyed by the conduit 105, and filtrate (from the first stage 99 of the filter 101) conveyed by the conduit 103 are all introduced into the clarifier 39 sufficiently far away from a regenerated liquor take-away point 125 so as to permit sufficiently desirable and effective settling and migrating of the precipitate crystals and other solids into the sludge zone 89 and effective regenerating of the alkali-metal sulfite to the alkali-metal bisulfite in the clarifier 39.

Regenerated liquor is conveyed away from the clarifier 39 in a conduit 121. (That portion of regenerated liquor which is optionally conveyed to the vicinity of the reactor 49 and combined with scrubber bleed conveyed by the conduit 45 also has already been described hereinabove.) The remainder of regenerated liquor, not combined with scrubber bleed, is conveyed by the conduit 41 into the scrubber column 23.

To make up for evaporation losses in the scrubbing unit 35, fresh water, conveyed by a conduit 119, is occasionally added to the regenerated liquor conveyed by the conduit 41. It is not critical that the fresh water be added to this particular conduit 41. The fresh water could just as well be added to the conduit 27, the conduit 17, the conduit 45 or any one of a number of other conduits conveying scrubber liquor, spent scrubber liquor, scrubber bleed, regenerated liquor or underflow slurry.

In FIG. 1, the active alkali-metal compound conveyed in the conduit 105 is shown as being introduced into the clarifier 39. However, for a variety of reasons it may be desirable to add the active alkali-metal compound to the regenerated liquor or to the scrubber liquor. In the preferred embodiment, addition of the active alkali-metal compound into the clarifier 39 is desirable because such addition permits a certain amount of suspendable and non-reactable solids present with the active alkali-metal compound to settle into the sludge zone 89 and to be conveyed by the conduit 123 to the filter 101 for removal from the process in the form of filter cake.

Fresh water conveyed by a conduit 117 is supplied to a second stage 115 of the filter 101 to recover sodium from the filter cake. Filter cake is removed essentially continuously from the second stage 115 of the filter 101 by commercially available means and is conveyed by a take-away means (such as a screw conveyor) 113 away from the process. The second stage 115 of the filter 101 produces a quantity of first stage wash liquor which is shown in FIG. 1 as being conveyed away from the second stage 115 by a conduit 111 and being introduced into the first stage 99 to wash the filter cake as it forms.

That portion of underflow slurry hereinabove mentioned as being conveyed by the conduit 123 to the filter 101, forms filter cake in the first stage 99 as the underflow slurry is introduced into the first stage 99 of the filter 101, and filtrate is conveyed away from the filter 101 by the conduit 103.

The design of the filter 101 is not a critical element of the present invention. Although the preferred embodiment shows the filter 101 (a dewatering device) as comprising the first stage 99 and the second stage 115, any one of a number of commercially available dewatering devices, such as vacuum filter, a centrifuge, or a belt press is currently believed to be equivalent to the dewatering device illustrated in FIG. 1.

We claim:

1. A process for removing sulfur oxides from a sulfur oxides-containing gas stream, said process including contacting said gas stream with an aqueous alkali-metal sulfite solution reactable with said sulfur oxides thereby forming an alkali-metal bisulfite solution, contacting said alkali-metal bisulfite solution with an alkaline-earth metal hydroxide solution reactable with said alkali-metal bisulfite solution thereby reacting at least a portion of said alkali-metal bisulfite solution and forming a reaction solution including a plurality of forming precipitate crystals, said precipitate crystals including an alkaline-earth metal sulfite, said process comprising: maintaining said reaction solution at a pH of between about 11 and 13.5; and effectively agitating said reaction solution with an impeller having a tip speed between about 5 to about 15 feet per second for causing said precipitate crystals to grow to a crystal size from about 20 to about 40 microns for facilitating dewatering of said crystals.

2. A dual alkali process for removal of sulfur oxides from a sulfur oxides-containing gas stream, the process comprising: contacting in a scrubber the gas stream with an aqueous scrubbing solution including an alkali-metal sulfite reactable with said sulfur oxides whereby at least a portion of said sulfur oxides are absorbed into said scrubbing solution thereby consuming at least a portion of said alkali-metal sulfite and forming a spent scrubbing liquor, said spent scrubbing liquor including an alkali-metal bisulfite; admixing into and holding within a reactor solution contained within an agitated reactor at least a portion of said spent scrubbing liquor and an effective amount of an alkaline-earth metal hydroxide reactable with said alkali-metal bisulfite for an amount of time sufficient for forming and for growing in said reactor solution a plurality of precipitate crystals, said precipitate crystals including an alkaline-earth metal sulfite, the forming and the growing of said precipitate crystals thereby consuming at least a portion of said alkali-metal bisulfite; effectively agitating said reactor solution in said reactor with an impeller having a tip speed from about 5 to about 15 feet per second while maintaining the pH of said reactor solution at a pH from about 11 to 13.5 so as to cause said precipitate crystals to form yet so as not to interfere with the growing of said precipitate crystals; admixing into a clarifier solution contained within a clarifier at least a portion of said reactor solution and an effective amount of an alkali-metal compound reactable with said alkali-metal bisulfite thereby forming in said clarifier a regenerated alkali-metal sulfite, said portion of said reactor solution including at least a portion of said precipitate crystals and at least a portion of the remainder portion of said alkali-metal bisulfite; withdrawing from said clarifier and introducing into said scrubber an effective amount of said regenerated alkali-metal sulfite in a manner sufficient for causing said regenerated alkali-metal sulfite to mix with and substantially to become combined with said aqueous scrubbing solution for replenishing said portion of said alkali-metal sulfite consumed; and withdrawing from said clarifier and introducing into a filter an effective amount of said clarifier solution for removing from said clarifier an amount of said precipitate crystals which is substantially stoichiometrically equivalent to said portion of said sulfur oxides absorbed.

3. A dual alkali process for removal of sulfur oxides from a sulfur oxides-containing gas stream, said sulfur oxides including sulfur dioxide and sulfur trioxide, the process comprising: contacting in a scrubber the gas stream with an aqueous scrubbing solution including an alkali-metal sulfite reactable with said sulfur oxides whereby at least a portion of said sulfur oxides are absorbed into said scrubbing solution thereby consuming at least a portion of said alkali-metal sulfite and forming a spent scrubbing liquor, said alkali-metal sulfite including sodium sulfite, said spent scrubbing liquor including an alkali-metal bisulfite, said alkali-metal bisulfite including sodium bisulfite; admixing into and holding within a reactor solution contained within an agitated reactor at least a portion of said spent scrubbing liquor and an effective amount of an alkaline-earth metal hydroxide reactable with said alkali-metal bisulfite for an amount of time ranging between about 7 and about 90 minutes and maintaining pH of said reactor solution between about 11 and about 13.5 for forming and for growing in said reactor solution a plurality of precipitate crystals, said alkaline-earth metal hydroxide including calcium hydroxide, said precipitate crystals including an alkaline-earth metal sulfite, said alkaline-earth metal sulfite including calcium sulfite, the forming and the growing of said precipitate crystals consuming at least a portion of said alkali-metal bisulfite, said agitated reactor including an impeller for agitating said reactor solution; effectively agitating said reactor solution in said reactor with said impeller and maintaining tip speed of said impeller between about 5 and about 15 feet per second so as to cause said precipitate crystals to form yet so as not to interfere with the growing of said precipitate crystals; admixing into a clarifier solution contained within a clarifier at least a portion of said reactor solution and an effective amount of an alkali-metal compound reactable with said alkali-metal bisulfite thereby forming in said clarifier a regenerated alkali-metal sulfite, said alkali-metal compound including sodium carbonate, said regenerated alkali-metal sulfite including regenerated sodium sulfite, said portion of said reactor solution including at least a portion of said precipitate crystals and at least a portion of the remainder portion of said alkali-metal bisulfite; withdrawing from said clarifier and introducing into said scrubber an effective amount of said regenerated alkali-metal sulfite in a manner sufficient for causing said regenerated alkali-metal sulfite to mix with and substantially to become combined with said aqueous scrubbing solution for replenishing said portion of said alkali-metal sulfite consumed; and withdrawing from said clarifier and introducing into a filter an effective amount of said clarifier solution for removing from said clarifier an amount of said precipitate crystals which is substantially stoichiometrically equivalent to said portion of said sulfur oxides absorbed.

4. The process of claim 1 wherein the admixing step further includes maintaining pH of said reactor solution between about 11 and about 12.3.

5. The process of claim 1 wherein the admixing step further includes maintaining pH of said reactor solution between about 12 and about 12.3.

6. The process of claim 1 wherein the agitating step further includes maintaining tip speed of said impeller at about 10 feet per second.

* * * * *

UNITED STATES PATENT AND TRADEMARK OFFICE
CERTIFICATE OF CORRECTION

PATENT NO. : 4,411,875

DATED : October 25, 1983

INVENTOR(S) : Robert S. Butler, Paul F. Claerbout, Louis P. Kent
RAndy S. Cleland, James H. Welhelm & Richard E. Micko It is certified that error appears in the above-identified patent and that said Letters Patent is hereby corrected as shown below:

Column 14, line 54, "1" should be --3--.

Column 14, line 57, "1" should be --3--.

Column 14, line 60, "1" should be --3--.

Signed and Sealed this

Twelfth Day of June 1984

[SEAL]

Attest:

GERALD J. MOSSINGHOFF

Attesting Officer

Commissioner of Patents and Trademarks